(12) United States Patent
Zou et al.

(10) Patent No.: US 9,825,867 B2
(45) Date of Patent: Nov. 21, 2017

(54) SUPPORTING SOFTWARE DEFINED NETWORKING WITH APPLICATION LAYER TRAFFIC OPTIMIZATION

(71) Applicant: Futurewei Technologies, Inc., Plano, TX (US)

(72) Inventors: Ting Zou, Cupertino, CA (US); Haiyong Xie, Union City, CA (US); Hongtao Yin, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/134,495

(22) Filed: Apr. 21, 2016

(65) Prior Publication Data

US 2016/0234121 A1 Aug. 11, 2016

Related U.S. Application Data

(62) Division of application No. 13/801,850, filed on Mar. 13, 2013, now Pat. No. 9,350,671.

(60) Provisional application No. 61/614,349, filed on Mar. 22, 2012.

(51) Int. Cl.
*H04L 12/801* (2013.01)
*H04L 12/24* (2006.01)
(Continued)

(52) U.S. Cl.
CPC .......... *H04L 47/19* (2013.01); *H04L 41/0893* (2013.01); *H04L 41/12* (2013.01);
(Continued)

(58) Field of Classification Search
CPC ..... H04L 47/19; H04L 41/0893; H04L 41/12; H04L 45/02; H04L 45/64; H04L 69/329; H04L 45/42
(Continued)

(56) References Cited

U.S. PATENT DOCUMENTS

| 8,606,847 B2 | 12/2013 | Raghunath et al. |
| 2009/0129573 A1 | 5/2009 | Gavan et al. |

(Continued)

FOREIGN PATENT DOCUMENTS

| CN | 102291447 A | 12/2011 |
| CN | 102316091 A | 1/2012 |
| EP | 2391092 A1 | 11/2011 |

OTHER PUBLICATIONS

Gurbani, V., et al., "Abstracting network state in Software Defined Networks (SDN) for rendezvous services," IEEE International Conference on Communications, Jun. 10-15, 2012, pp. 6627-6632.

(Continued)

*Primary Examiner* — Obaidul Huq
(74) *Attorney, Agent, or Firm* — Conley Rose, P.C.

(57) ABSTRACT

An Application Layer Traffic Optimization (ALTO) node comprising a processor configured to import a first set of network information from one or more software defined networking (SDN) nodes, aggregate the network information received from the SDN nodes, calculate a plurality of traffic optimization decisions based on the aggregated network information, and forward the traffic optimization decisions to the SDN nodes. Also disclosed is a method for optimizing traffic using a SDN node and an Application Layer Traffic Optimization (ALTO) node, the method comprising receiving a request for network resources from a node, obtaining a plurality of traffic optimization information from the ALTO node, negotiating one or more paths with a second SDN node using the traffic optimization information received from the ALTO node, constructing the paths, and sending a response to the node that indicates the node may forward packets via one of the paths.

20 Claims, 3 Drawing Sheets

(51) Int. Cl.
*H04L 12/715* (2013.01)
*H04L 12/751* (2013.01)
*H04L 29/08* (2006.01)
*H04L 12/717* (2013.01)

(52) U.S. Cl.
CPC .............. *H04L 45/02* (2013.01); *H04L 45/64* (2013.01); *H04L 69/329* (2013.01); *H04L 45/42* (2013.01)

(58) Field of Classification Search
USPC ........................................ 370/229, 235, 238
See application file for complete search history.

(56) References Cited

U.S. PATENT DOCUMENTS

| | | | |
|---|---|---|---|
| 2012/0144066 A1 | 6/2012 | Medved et al. | |
| 2012/0281621 A1* | 11/2012 | Lotfallah | H04L 12/145 370/328 |
| 2013/0058339 A1 | 3/2013 | Casado et al. | |
| 2013/0121209 A1 | 5/2013 | Padmanabhan et al. | |
| 2013/0124707 A1 | 5/2013 | Ananthapadmanabha et al. | |
| 2013/0223226 A1 | 8/2013 | Narayanan et al. | |

OTHER PUBLICATIONS

Gurbani, V., et al., "Software Defined Networks (SDN): Leveraging network state for rendezvous services," IEEE International Conference on Communications, Jun. 10-15, 2012, 5 pages.

Koponen, T., et al., "Onix: A Distributed Control Platform for Large-scale Production Networks," Proceedings of the 9th USENIX conference on Operating system design and implementation, 2010, 14 pages.

Alimi, R., Ed., et al., "ALTO Protocol," draft-ietf-alto-protocol-13. txt, Sep. 7, 2012, 77 pages.

Xie, H., et al., "Use Cases for ALTO with Software Defined Networks," draft-xie-alto-sdn-extension-use-cases-00, Jun. 28, 2012, 29 pages.

Xie, H., et al., "Use Cases for ALTO with Software Defined Networks," draft-xie-alto-sdn-extension-use-cases-01, Jan. 9, 2013, 30 pages.

Notice of Allowance dated Jan. 21, 2016, 9 pages, U.S. Appl. No. 13/801,850, filed Mar. 13, 2013.

Office Action dated Jan. 23, 2015, 6 pages, U.S. Appl. No. 13/801,850, filed Mar. 13, 2013.

Office Action dated Mar. 26, 2015, 21 pages, U.S. Appl. No. 13/801,850, filed Mar. 13, 2013.

Office Action dated Aug. 19, 2015, 22 pages, U.S. Appl. No. 13/801,850, filed Mar. 13, 2013.

Foreign Communication From A Counterpart Application, Chinese Application No. 201380015029.0, Chinese Search Report dated Jun. 23, 2016, 2 pages.

Foreign Communication From A Counterpart Application, Chinese Application No. 201380015029.0, Chinese Office Action dated Jul. 1, 2016, 6 pages.

* cited by examiner

SUPPORTING SOFTWARE DEFINED NETWORKING WITH APPLICATION LAYER TRAFFIC OPTIMIZATION

CROSS-REFERENCE TO RELATED APPLICATIONS

This application is a divisional of U.S. patent application Ser. No. 13/801,850 filed Mar. 13, 2013, by Ting Zou, et al. and entitled "Supporting Software Defined Networking With Application Layer Traffic Optimization," which claims priority to U.S. Provisional Patent Application No. 61/614,349 filed Mar. 22, 2012 by Ting Zou, et al. and entitled "Supporting Software Defined Networking With Application Layer Traffic Optimization," each of which is incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks comprise network nodes, such as routers, switches, bridges, and other devices that transport data through the network. Over the years, the telecommunication industry has made significant improvements to the network nodes to support an increasing number of protocols and specifications standardized by the Internet Engineering Task Force (IETF). Creating and coupling the complex network nodes to form networks that support and implement the various IETF standards (e.g. virtual private networks requirements) has inadvertently cause modern networks to become labyrinth-like and difficult to manage. As a result, vendors and third-party operators continually struggle to customize, optimize, and improve the performance of the interwoven web of network nodes.

Software defined networking (SDN) is an emerging network technology that addresses customization and optimization concerns within convoluted networks. SDN simplifies modern networks by decoupling the data-forwarding capability (e.g. the data plane) from routing, resource, and other management functionality (e.g. the control plane) previously performed in the network nodes. Network nodes that support SDN (e.g., that are SDN compliant) may be configured to implement the data plane functions, while the control plane functions may be provided by a SDN controller. Open Application Programming Interface (API) services, such as the OpenFlow protocol, may manage the interactions between the data plane and control plane and allow for the implementation of non-vendor specific combinations of networking nodes and SDN controllers within a network. As a result, SDN in conjunction with an Open API service may provide numerous benefits to modern networks that include increased network virtualization, flexible control and utilization of the network, and customization of networks for scenarios with specific requirements.

Modern networks, such as data center networks, enterprise networks, and carrier networks, may gradually adopt SDN because of the numerous potential benefits. The deployment of SDN into large-scale distributed networks may be implemented incrementally. In other words, a network administrator for a large-scale network may partition the entire network into multiple smaller sub-networks. Some of the sub-networks may be SDN compatible, while other sub-networks may not be SDN compatible. Unfortunately, network services, such as application layer traffic optimization (ALTO), may encounter integration problems when implementing SDN within a large-scale network. More specifically, integrating SDN with ALTO may produce problems that include, but are limited to, privacy preservation, granularity of information collection and exchange, and redundant processing. Therefore, properly integrating SDN with different network services is important in maintaining and improving network performance.

One method to integrate ALTO and SDN is to have an ALTO node directly collect network information from network nodes within a network. As discussed above, SDN controllers may perform control plane functions that include collecting information for network topology and providing routing information. As a result, the network may inadvertently use both the SDN controllers and an ALTO node to collect redundant network information. Moreover, the network may comprise a substantial number of network nodes. To avoid having network nodes maintain a long history of network information, the ALTO node may frequently collect network information from the network nodes. The frequent collection of network information may generate a massive amount of network information that may overload the ALTO node. Therefore, configuring the ALTO node to directly collect network information from network nodes may cause processing bottlenecks and network inefficiencies.

From a security standpoint, privacy concerns may also arise when the ALTO node directly collects network information from network nodes. When a network is partitioned into sub-networks, one or more sub-networks may be owned by third-party content providers or virtual network providers. In such a case, the third-party content providers or virtual network providers may set privacy policies that prevent internal network information regarding the sub-networks from being exported to external entities such as an ALTO node. As such, the ALTO node may be unable to extract network information directly from the network nodes unless the ALTO node violates the privacy policies. For the ALTO node to receive network information, sub-networks may need to aggregate and filter out private network information before sending the network information to the ALTO node. Thus, the ALTO node may need to communicate with SDN controllers that manage the sub-networks to receive aggregated and filtered network information. Unfortunately, the current SDN and ALTO environment does not provide a mechanism to facilitate the transfer of aggregated and filtered network information between the SDN controllers and the ALTO node. Hence, a solution is needed to efficiently integrate SDN and ALTO within a network.

SUMMARY

In one embodiment, the disclosure includes a network node for managing the control plane functions for a plurality of nodes within a SDN domain, comprising a processor configured to collect a plurality of network information from the nodes, forward the network information based on a plurality of domain-specific policies, receive traffic optimization information based on the network information, and compute forwarding decisions for the nodes based on the traffic optimization information.

In yet another embodiment, the disclosure includes an ALTO node, comprising a processor configured to import a first set of network information from one or more SDN nodes, aggregate the network information received from the SDN nodes, calculate a plurality of traffic optimization decisions based on the aggregated network information, and forward the traffic optimization decisions to the SDN nodes.

In yet another embodiment, the disclosure includes a method for optimizing traffic using a SDN node and an ALTO node, wherein the method comprises receiving a request for network resources from a node, obtaining a plurality of traffic optimization information from the ALTO node, negotiating one or more paths with a second SDN node using the traffic optimization information received from the ALTO node, constructing the paths, and sending a response to the node that indicates the node may forward packets via one of the paths.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, an apparatus, and a system that supports SDN with ALTO. A network may be separated into three logical layers: (1) the network node logical layer, (2) the SDN controller logical layer, and (3) the ALTO node logical layer. Network nodes within the network typically participate in the network node logical layers. The SDN controller logical layer may comprise one or more SDN controllers. Each SDN controller may manage a group of networking nodes and/or be responsible for collecting network information from the network nodes. The SDN controller may define a set of aggregation and/or filtering policies, which may be applied to network information collected from network nodes. After aggregating and/or filtering network information, the SDN controller may export the network information to the ALTO node logical layer via a push model or a pull model. The ALTO node logical layer may comprise one or more ALTO nodes. The ALTO nodes may aggregate network information exported from the SDN controllers and perform traffic-optimization decisions for the network. The ALTO nodes may then feedback the traffic-optimization decisions to the SDN controller logic layer, where the SDN controllers may optimize traffic based on the traffic-optimization decisions calculated by the ALTO nodes.

Figure 1:
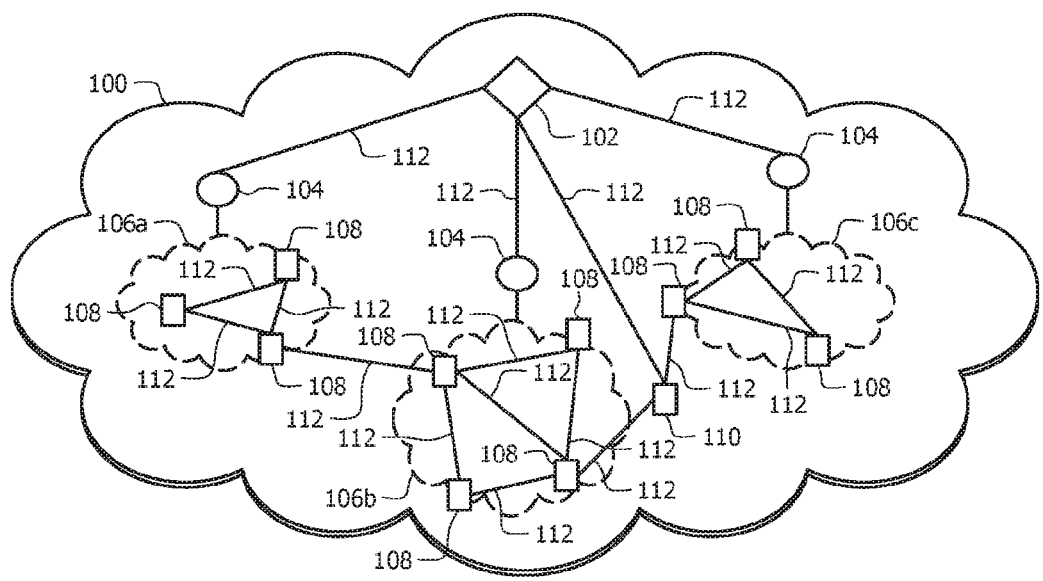
FIG. 1 is a schematic diagram of an embodiment of a network that supports SDN with ALTO.

FIG. 1 is a schematic diagram of an embodiment of a network 100 that supports SDN with ALTO. Network 100 may be any network that transports data, such as Internet Protocol (IP) networks, Multiprotocol Label Switching (MPLS) networks, Ethernet networks, and data center networks. Network 100 may be a network comprising one or more local area networks (LANs), virtual networks, and/or wide area networks (WANs). Network 100 may be a network that operates in the electrical, optical, or a combination of both domains. Network 100 may offer data services that forward data from one node to another node without using pre-configured routes. Another embodiment of network 100 may forward data from one node to another node across the network along pre-configured or pre-established paths.

As shown in FIG. 1, network 100 may comprise network nodes 108 (e.g. SDN compliant network nodes) located within a plurality of SDN domains 106a-c, an ALTO node 102, one or more non-SDN compliant network nodes 110, and a plurality of links 112. Links 112 may be used to interconnect nodes within network 100, such as network nodes 108, ALTO node 102, SDN controllers 104, and non-SDN compliant network nodes 110. Links 112 may couple the different nodes directly using fiber optic links, electrical links, wireless links, or indirectly using a logical connection or physical links with intervening nodes. Links 112 may comprise a single link, a series of parallel links, a plurality of interconnected nodes, or various combinations thereof used to transport data within network 100.

Network 100 may be configured to support a variety of network applications, such as network virtualization, peer-to-peer file sharing, client-server file sharing, real-time communication, and on-demand media streaming. Network 100 may use the ALTO node 102 and SDN controllers 104 to construct traffic-optimized paths to support the network applications. Some of these network applications may be SDN-compliant applications that locate and directly communicate with SDN controllers 104. Other network applications may be non-SDN compliant network applications that indirectly communicate with SDN controllers via application protocol datagrams (e.g. user datagram protocol (UDP)). The application protocol diagrams may specify requirements for network resources (e.g. video data, audio data, and text data) for the non-SDN compliant network applications. The application protocol datagrams may be encoded such that the application protocol datagrams indicate that the packets are SDN-specific requests. The application protocol datagrams may be transmitted to one or more network nodes 108, which may subsequently forward the application protocol datagrams to SDN controllers 104. Once a SDN controller receives the application protocol datagram, the SDN controllers 104 calculate data paths for the non-SDN compliant network applications as discussed in FIGS. 3 and 4. Packets transmitted for non-SDN compliant network applications may be transmitted in a best effort fashion (e.g. as best effort packets).

Network 100 may be partitioned into a plurality of sub-networks to reduce the complexity of managing network 100. To reduce the complexity of managing network 100, each of the sub-networks may be managed independently, to some degree. Some or all of the sub-networks may be managed by SDN controllers 104 located within SDN domains 106a-c. The SDN domains 106a-c may generally be referred to as SDN domains 106 throughout this disclosure. A SDN domain 106 may be a sub-network of network 100 that comprise a plurality of network nodes 108 coupled to a SDN controller 104. The SDN domain 106 may span across a large geographical area or encompass a large number of network nodes 108. The SDN domain 106 may be further divided into two or more sub-networks to reduce the complexity of managing the SDN domain 106. In another embodiment, the SDN domain 106 may be one or more data center networks. As shown in FIG. 1, SDN domain 106 may be connected to other SDN domains 106 and/or non-SDN compliant network nodes 110 via links 112.

Within each SDN domain 106, a SDN controller 104 may be configured to oversee the routing and other management functions (e.g. the control plane) for network nodes 108 within the SDN domain 106. The SDN controller 104 may not perform data plane functions, such as forwarding data traffic to a selected destination. The SDN controller 104 may be a generalized network controller configured to control the network nodes 108 by performing control path or control plane functionality, such as drawing a network map for the SDN domain 106 and performing resource management functions. Moreover, the SDN controller 104 may be able to produce routing tables and/or flow tables that defines how to route incoming packets within the SDN domain 106. In one embodiment, the SDN controller 104 may be integrated within a network operating system.

As part of the control plane functionality, the SDN controller 104 may be configured to collect fine-grain network information from network nodes 108 within the SDN domain 106. Fine-grain network information may pertain to any of the information within the SDN domain 106, which may include, but are not limited to, the SDN domain topology, link capacity within the SDN domain 106, available bandwidth on each link with the SDN domain 106, and status of links that belong to the SDN domain 106 but are connected to network nodes 108 and/or non-SDN compliant network nodes 110 external to the SDN domain 106. In one embodiment, the fine-grain network information may be information collected at the packet level (e.g. Open System Interconnection (OSI) layer 3). SDN controllers 104 may collect fine-grain network information via a southbound API service, such as the OpenFlow protocol. SDN controllers may use the fine-grain network information to implement data-forwarding decisions, such as calculating flow tables within the SDN domain 106.

When a network administrator and/or operator divides network 100 into multiple SDN domains 106, the network administrator and/or operator may choose to implement different privacy policies within each SDN domain 106. For example, a network administrator may dedicate an SDN domain 106 to a customer to manage network resources for the customer. Specific fine-grain network information, such as the customer's network topology may not be disclosed to an external node, such as an ALTO node 102. A SDN controller 104 may be further configured to define domain-specific policies for network information imported from network nodes 108, aggregate the fine-grain network information collected from network nodes 108, and export the aggregated network information to external nodes that avoid privacy violations. The domain-specific policies managed by a SDN controller 104 may not be made public, and other SDN controllers 104 within other SDN domains 106 and/or external nodes (e.g. ALTO node 102) may not be aware of the existence of the domain-specific policies. The domain-specific policies managed by a SDN controller 104 may include, but are not limited to policies for allocating resources, aggregating and presenting network information, controlling the granularity of network information exported to the ALTO node 102, and determining which external nodes may receive the aggregated network information.

A SDN controller 104 may be configured to directly communicate with network nodes 108 via a southbound Open API service, such as the OpenFlow protocol. Network nodes 108 may be any physical and/or virtual network device that receives and transmits data through the SDN domain 106. Network nodes 108 may comprise switches, routers, bridges, or any other devices compatible with the Open API services. For example, network nodes 108 may be configured according to the OpenFlow protocols as defined in Rev. 1.2 for the OpenFlow specification of the OpenFlow Organization, published December 2011, which is incorporated herein as if reproduced in its entirety. Furthermore, network nodes 108 may also include network devices that are compliant with other versions of the OpenFlow protocols (e.g. Rev. 1.0 and Rev. 1.1). In one embodiment, network nodes 108 may be incompatible with other versions of the OpenFlow protocols. For example, one network node 108 may support the OpenFlow protocol version 1.0, but not later versions, while another network node 108 may support the OpenFlow protocol version 1.2, but not earlier versions. Typically, network nodes 108 within network 100 may be under the control of one SDN controller 104.

As discussed above, implementing SDN within networks may be done incrementally, and thus a portion of network 100 may not be SDN capable. FIG. 1 illustrates that network 100 may comprise at least one non-SDN compliant network node 110. Non-SDN compliant network k nodes 110 may be substantially similar to network nodes 108 except that the non-SDN compliant network nodes 110 may not be able to communicate with an SDN controller 104 using a southbound Open API service. The non-SDN compliant network nodes 110 may be located outside the SDN domains 106 and may not be managed by a SDN controller 104. FIG. 1 illustrates that the non-SDN compliant network nodes 110 may be coupled to ALTO node 102. The non-SDN compliant network nodes 110 may be configured to communicate and provide network information directly to an ALTO node 102 for traffic optimization.

The ALTO node 102 may be any network device, such as an ALTO server, configured to implement the ALTO protocol as defined in the IETF publication "draft-ietf-alto-protocol-13," published Sep. 7, 2012, which is incorporated herein as if reproduced in its entirety. FIG. 1 illustrates that the ALTO node 102 may communicate with SDN controllers 104 and non-SDN compliant network nodes 110. The ALTO node 102 may communicate with SDN controllers 104 via a northbound Open API protocol to collect network information and/or transmit traffic-optimization decisions. The northbound Open API protocol may be a SDN-ALTO protocol that accommodates message exchanges between the ALTO node 102 and the SDN controllers 104. The ALTO node 102 may collect network information from SDN controllers using a pull model and/or push model. The pull and push model will be discussed in more detail in FIG. 2.

The ALTO node 102 may be responsible for calculating traffic-optimization decisions for network 100 when supporting network applications. The traffic-optimization decisions may be for some or all of the sub-networks within network 100. For example, the ALTO node 102 may calculate traffic-optimization decisions for some of the SDN domains 106 or for all of the SDN domains 106 within network 100. The ALTO node 102 may calculate traffic-optimization decisions pursuant to requests by SDN controllers 104, network nodes 108 that operate as network path end points, and/or non-SDN compliant network nodes 110 that operate as network path end points. The traffic-optimization decisions may modify network resource consumption patterns while maintaining and improving network performance. The traffic-optimization decisions may produce network maps and/or cost maps as defined in the IETF publication "draft-ietf-alto-protocol-13." For instance, cost maps may indicate the path costs transport data for a path that spans across multiple SDN domains.

The ALTO node 102 may also be responsible for aggregating network information exported from the SDN controllers 104 as well as non-SDN compliant network nodes 110. As discussed above, the SDN controller 104 may export filtered and/or aggregated network information based on domain-specific policies. The ALTO node may be configured to obtain the filtered and/or aggregated network information from the SDN controllers 104 and obtain unfiltered and/or un-aggregated network information from non-SDN compliant network nodes 110. In one embodiment, the unfiltered and/or un-aggregated network information from non-SDN compliant network nodes 110 may be located in a network operation center. After obtaining network information from the SDN controllers 104 and non-SDN compliant network nodes 110, the ALTO node 102 may aggregate the network information to form a complete view of network 100. In other words, the ALTO node 102 may combine the received network information to generate network maps and cost maps for network 100. SDN controllers 104 may obtain the cost maps from ALTO 102 and apply the cost maps when making data-forwarding decisions.

As discussed above, the SDN controllers 104 may determine the granularity of the network information exported to the ALTO node 102. For example, the ALTO node 102 may receive coarse-grain network information (e.g. aggregated network information) that pertains to network information that generally describes the SDN domain 106 (e.g. at the SDN logical layer level). Coarse-grain network information may include large-scale network topology network information, connectivity between SDN domains 106, bandwidth capacity of SDN domains 106, and aggregated volume network information for SDN domains 106. Alternatively, the ALTO node 102 may receive fine-grain network information (e.g. un-aggregated network information) that pertains to network information within the SDN domain 106 (e.g. at the network node logical layer level). After the SDN controller obtains the cost maps from the ALTO node 102, SDN controllers 104 could leverage the cost maps with greater detail about their own domains and use the more detailed cost maps to generate more detailed traffic-optimization decisions when compared to exporting coarse-grain network information to the ALTO node 102. Exporting coarse-grain network information rather that fine-grain network information may prevent the overloading of the ALTO node 102 with network information.

Recall that SDN controllers 104 may be responsible for managing a specific SDN domain 106. Although a SDN controller 104 may receive network information within a specific SDN domain 106, the SDN controller 104 may not receive network information that pertains to other SDN domains. Thus, a SDN controller 104 may not be aware of the status of other SDN domains 106. However, in order to allocate the resources to satisfy certain network services (e.g. on-demand bandwidth, quality of services requirements) an SDN controller 104 may involve other SDN controllers 104 to create network paths that traverse multiple SDN domains 106. Using FIG. 1 as an example, one network path end point may be located in SDN domain 106a, while the other network path end point may be located in SDN domain 106c. The path for the network path end points may span across multiple SDN domains 106a-c. The ALTO node 102 may use the exported network information to calculate optimal paths across the multiple SDN domains 106a-c. In another embodiment, SDN interconnection protocols may be used between SDN controllers 104 to obtain network information that relates to other SDN domains 106.

Figure 2:
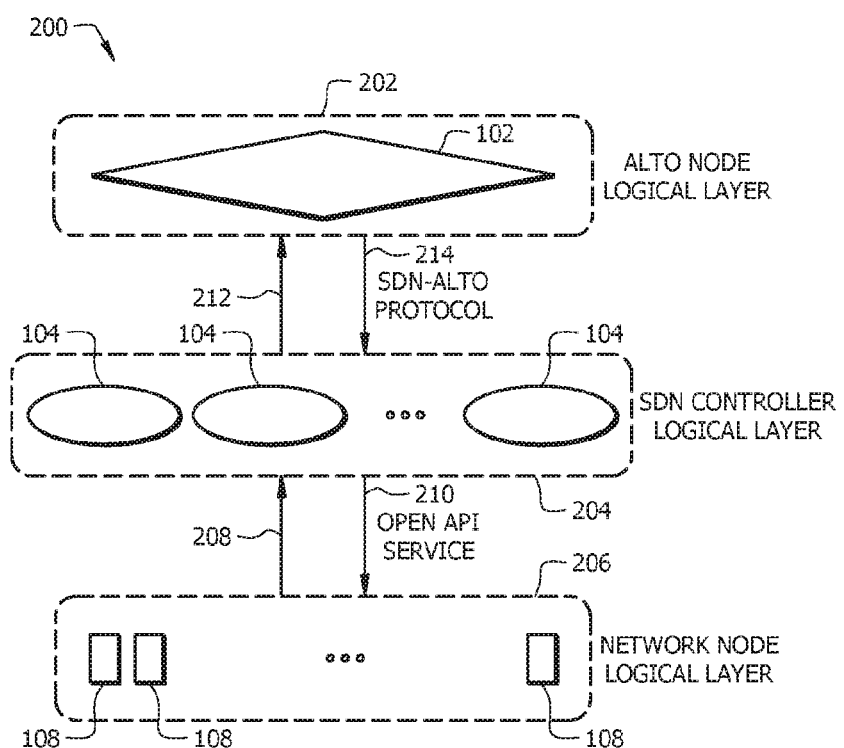
FIG. 2 is a schematic diagram of an embodiment of a network that comprises a network node logical layer, a SDN controller logical layer, and an ALTO node logical layer.

FIG. 2 is a schematic diagram of an embodiment of a network 200 that comprises a network node logical layer 206, a SDN controller logical layer 204, and an ALTO node logical layer 202. The network node logical layer 206 and the SDN controller logical layer 204 may be combined to form one or more SDN domains within network 200. FIG. 2 illustrates that the network node logical layer 206 may comprise a plurality of network nodes 108 located within network 200. The network node logical layer 206 may provide data messages 208 to the SDN controller logical layer 204. The data messages 208 may be fine-grain network information that may not have been aggregated and/or filtered by the network nodes 108 located within the network node logical layer 206. The network node logical layer 206 may receive control messages 210 from the SDN controller logical layer 204. The control messages 210 may provide routing information and other traffic optimizing information to network nodes 108. The control messages 210 may be used to implement data-forwarding decisions within a SDN domain. The two-way message exchanges between the network node logical layer 206 and the SDN controller logical layer 204 may be implemented using a southbound Open API service, such as the OpenFlow protocol.

FIG. 2 also illustrates that SDN controller logical layer 204 may participate in a two-way message exchange with the ALTO node logical layer 202. The SDN controller logical layer 204 may comprise a plurality of SDN controllers 104, while the ALTO node logical layer 202 may comprise one or more ALTO nodes 102. The SDN controller logical layer 204 may transmit data messages 212 to the ALTO node logical layer 202. In one embodiment, data messages 212 may be a plurality of packets that comprise internal network information that have been aggregated and/or filtered by domain-specific policies implemented within each SDN controller 104. Data messages 212 may include network information such as domain-level network cost, bandwidth, and domain-specific connectivity. In another embodiment, data messages 212 may comprise fine-grain network information that may be similar to data messages 208. Afterwards, the SDN controller logical layer 204 may receive control messages 214. Control messages 214 may be a plurality of packets that comprise routing and traffic optimization information that pertains to specific SDN controllers 104 and specific SDN domains. SDN controllers 104 may use the control messages 214 to generate and transmit control messages 210 to the network node logical layer 206.

Prior to transmitting data messages 212 from the SDN controller logical layer 204 to the ALTO node logical layer 202, each of the SDN controllers 104 may communicate with the ALTO node 102 to negotiate the types of network information that may be provided to the ALTO node 102. The types of network information that may be provided may include, but are not limited to network node network information, network topology network information, network link network information, network routing network information, and path network information. The network node network information may include network and/or geographical location of the network nodes 108 within a SDN domain. Network topology network information may include a SDN-domain-level (e.g. fine-grain network information) topology and/or an SDN intra-domain topology (e.g. coarse-grain network information). The domain-specific policies within SDN controllers 104 may aggregate and export detailed intra-domain topology to the ALTO node 102. The network link network information may include network information, such as link usages, state link congestion, delay, and path costs within an SDN domain. The network routing network information may provide routing for flows defined in flow tables generated by SDN controllers 104. The path network information may provide path initiation and status managed by SDN controllers 104. The granularity of the different types of network information exported to the ALTO node 102 may be specified using domain-specific policies within SDN controllers 104.

SDN controllers 104 and ALTO node 102 may also negotiate services that the ALTO node 102 may provide to SDN controllers 104. The ALTO node 102 may generate network maps and cost maps at the granularity of SDN domains (e.g. coarse-grain decisions) and transmit the information using control messages 214. Another service that may be negotiated may be the selection of one or multiple paths among a set of paths at the granularity of SDN domains (e.g. coarse-grain decisions) to forward packets. Using FIG. 1 as an example, multiple paths may span across SDN domains 106a-c. The ALTO node 102 may select one or more of the paths when calculating traffic optimization decisions to route traffic from network node 108 within SDN domain 106a to a network node 108 within SDN domain 106c. In one embodiment, the selected paths may have a defined priority and/or failover definitions.

After negotiating the ALTO services and the types of network information provided to the ALTO nodes 102, data messages 212 may be extracted from the SDN controller logical layer 204 via the pull model and/or the push model. The pull model and/or push model may be subject to the aggregation and privacy policies defined for each SDN domain. In a pull model, an ALTO node 102 may proactively query one or more SDN controllers 106 to obtain network information. For example, the ALTO node may send a request message to one or more SDN controllers 106 that requests for network information. The ALTO node 102 may send the request message in time intervals ranging from minutes to hours. In one embodiment, a pull model may be used when no privacy policies are implemented in a sub-network of network 200. Using FIG. 1 as an example, an SDN domain could be dedicated to a certain customer, where usage of the SDN domain may be provided through privileged client access. In such a case, the ALTO node 102 for the network 100 may be unable to collect network information because of privacy policies. Even if the ALTO node 102 is configured to automatically pull network information directly from network nodes 108, the SDN domain may disallow the ALTO node 102 because customers who own and manage the SDN domain may enforce stringent privacy policies that disallow exporting network information externally.

ALTO nodes 102 within the ALTO node logical layer 202 may also use a push model to extract data messages 212 from the SDN controller logical layer 204. For a push model, SDN controllers 104 may proactively update one or more ALTO nodes 102 with aggregated and filtered network information. For example, the SDN controllers 104 may automatically push the network information to ALTO nodes 102 after aggregating and filtering network information. The SDN controllers 104 may push the current network information after a certain amount of time has elapsed. The time intervals may be in the range of minutes to hours. The SDN controllers 104 may push the current network information to the ALTO nodes 102 without receiving a request message from the ALTO nodes. The push model may be used when privacy policies are implemented in a sub-network of network 200. Both the pulling and/or pushing of data messages 212 may be implemented automatically and without intervention from network administrators and/or operators.

As soon as the ALTO node logical layer 202 receives the data messages 212, ALTO nodes 102 may use the network information from data messages 212 to calculate and produce traffic optimization information, such as network maps and cost maps, using the ALTO protocol as described in the IETF publication "draft-ietf-alto-protocol-13." Afterwards, the ALTO nodes 102 may transmit routing and traffic optimization information (e.g. SDN-specific network maps and cost maps) that pertains to a specific SDN controller 104 and/or a specific SDN domain 106. For example, in FIG. 1, the SDN controller 104 for SDN domain 106a may be interested in obtaining internal network information of other SDN domains 106b and 106c. The ALTO node 102 may tailor the routing and traffic optimization information sent to the SDN controller 104 for SDN domain 106a to include internal network information of the SDN domains 106b and 106c. Once the SDN controllers 104 receive control messages 214, the routing path may not be finalized until SDN controllers 104 propagate flow tables for flows that pertain to control messages 214.

Figure 3:
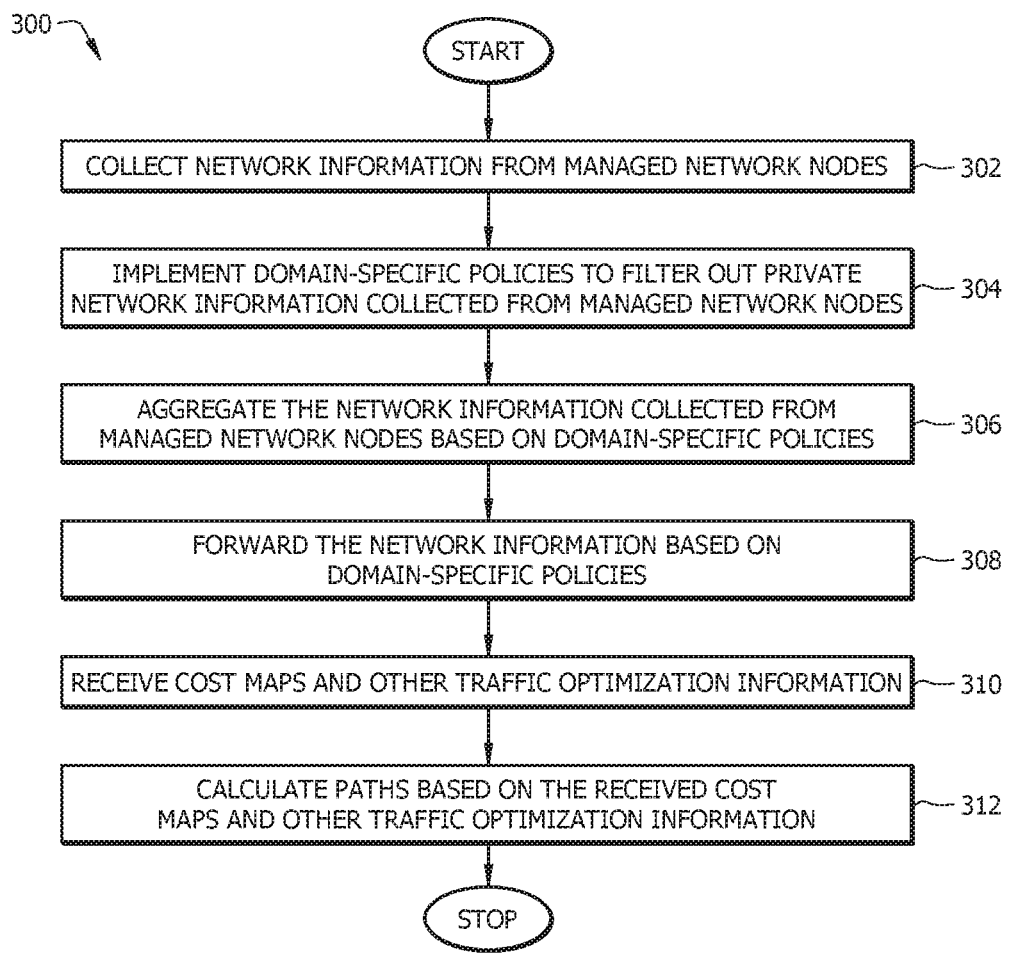
FIG. 3 is a flowchart of an embodiment of a method that manages the information flow between an SDN controller and an ALTO node.

FIG. 3 is a flowchart of an embodiment of a method 300 that manages the information flow between an SDN controller and an ALTO node. In one embodiment, method 300 may be used to optimize inter-data center data transfers. In certain instances, one or more data center networks may migrate or backup traffic to one or more other data center networks. Method 300 may manage the information to produce costs maps and other traffic optimization decisions that provision bandwidth and prioritize paths for the traffic migrated over to a data center network.

Method 300 may start at block 302 and collect network information from managed network nodes. The collected network information may be fine-grain network information that pertains to an SDN domain. After collecting the network information, method 300 may move to block 304. At block 304, method 300 may implement domain-specific policies to filter out private network information collected from managed network nodes. When SDN domains are owned by third-party content providers or virtual network providers, private network information may not be exported to external entities. The third-party content providers or virtual network providers may create domain-specific policies to filter out private network information. Method 300 may then progress to block 306 and aggregate the network information collected from managed network nodes based on domain-specific policies. Method 300 may vary the granularity of information exported to an ALTO node based on the domain-specific policies. Method 300 may continue to block 308 and forward the network information based on domain-specific policies. Method 300 may forward the network information to an ALTO node and then continue to block 310. At block 310, method 300 may receive cost maps and other traffic optimization information from the ALTO node. The cost maps and other traffic optimization information may be specific to the SDN controller and/or SDN domain. Method 300 may then continue to block 312 and calculate paths based on the received cost maps and other traffic optimization information. Method 300 may produce flow tables and implement other data-forwarding decisions based on the received cost maps and other traffic optimization information. Afterwards, method 300 stops.

Figure 4:
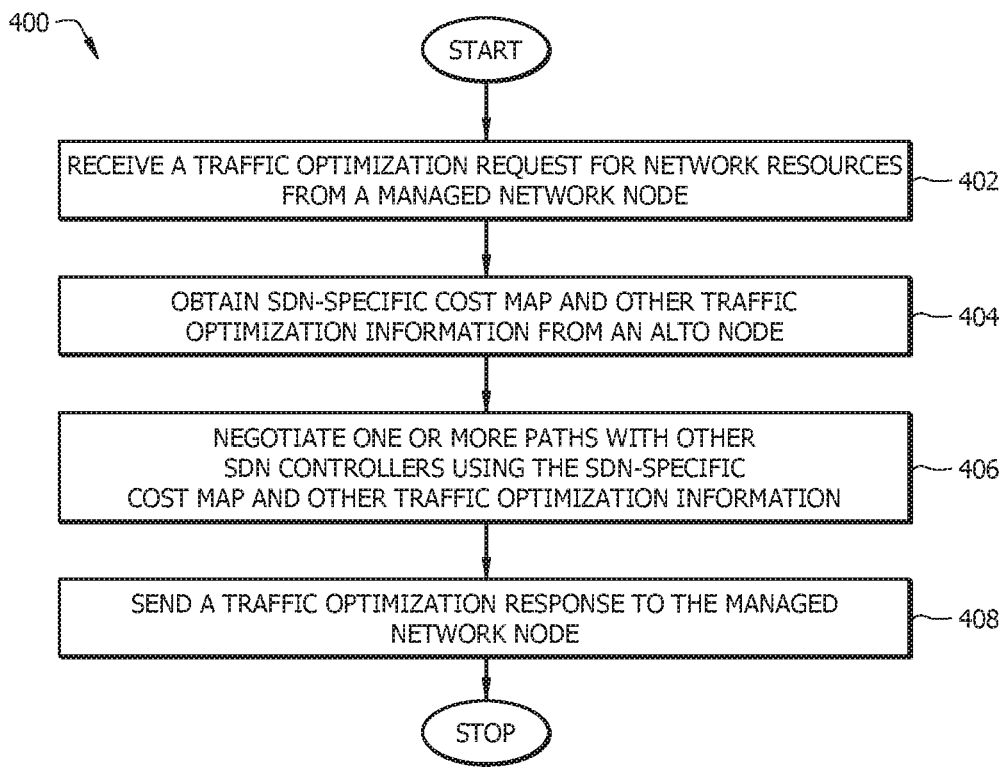
FIG. 4 is a flowchart of an embodiment of a method 400 that manages the information flow between an SDN controller and an ALTO node based on request from a network node.

FIG. 4 is a flowchart of an embodiment of a method 400 that manages the information flow between an SDN controller and an ALTO node based on request from a network node. In one embodiment, method 400 may be used when a network node requests for network resources to satisfy Quality of Service (QoS) parameters. For example, the network node requesting for network resources may be a source node that requests for a certain amount of bandwidth to reach the destination node. The source node and destination node may be located in different SDN domains. Method 400 may obtain costs maps and other network traffic optimization information from the ALTO node to determine one or more paths, which may span across multiple SDN domains that satisfy the bandwidth requirement. In another embodiment, method 400 may be used to support on-demand bandwidth by determining network topology, bandwidth, and latency across multiple SDN domains.

Method 400 may start at block 402 and receive a traffic optimization request for network resource from a managed network node. The traffic optimization request may include one or more destination node and network requirements (e.g. bandwidth) for the network resources. The managed network node may be a network node managed by the SDN controller and may be designated by the source node for a network application. After receiving a traffic optimization request, method 400 may move to block 404 and obtain SDN-specific cost maps and other traffic optimization information from an ALTO node. The SDN-specific cost maps may provide network information of other SDN domains. Method 400 may then move to block 406 and negotiate one or more paths with other SDN controllers using the SDN-specific cost map and other traffic optimization information. Negotiating amongst SDN controllers may occur when the paths span across multiple SDN domains. Method 400 may then progress to block 408 and send a traffic optimization response to the managed network node. The traffic optimization response may provide the forwarding information for the managed network node that sent the traffic optimization request. The managed network node may subsequently forward data to the destination node. After method 400 completes block 408, method 400 stops.

Figure 5:
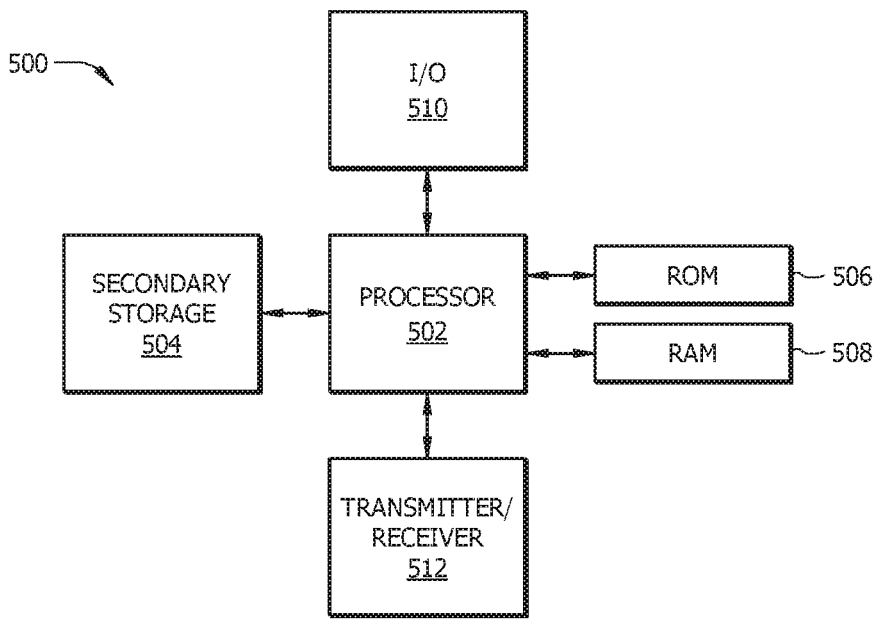
FIG. 5 is a schematic diagram of one embodiment of a general-purpose computer system suitable for implementing the several embodiments of the disclosure.

The schemes described above may be implemented on any general-purpose computer system, such as a computer or network component with sufficient processing power, memory resources, and network throughput capability to handle the necessary workload placed upon it. FIG. 5 illustrates a schematic diagram of a general-purpose computer system 500 suitable for implementing one or more embodiments of the methods disclosed herein, such as the SDN controller 104, the network node 108, and the non-SDN compliant network nodes 110. The computer system 500 includes a processor 502 (which may be referred to as a central processing unit or CPU) that is in communication with memory devices including secondary storage 504, read only memory (ROM) 506, random access memory (RAM) 508, transmitter/receiver 512, and input/output (I/O) device 510. Although illustrated as a single processor, the processor 502 is not so limited and may comprise multiple processors. The processor 502 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 502 may be configured to implement any of the schemes described herein, such as method 300 and method 400.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504. The secondary storage 504, ROM 506, and/or RAM 508 may be non-transitory computer readable mediums and may not include transitory, propagating signals. Any one of the secondary storage 504, ROM 506, or RAM 508 may be referred to as a memory, or these modules may be collectively referred to as a memory. Any of the secondary storage 504, ROM 506, or RAM 508 may be used to store forwarding information, network information, and traffic optimization information as described herein. The processor 502 may generate forwarding decisions and traffic optimization information in memory and/or retrieve the forwarding decisions and traffic optimization information from memory.

The transmitter/receiver 512 may serve as an output and/or input device of the SDN controller 104, the network node 108, and the non-SDN compliant network nodes 110. For example, if the transmitter/receiver 512 is acting as a transmitter, it may transmit data out of the computer system 500. If the transmitter/receiver 512 is acting as a receiver, it may receive data into the computer system 500. The transmitter/receiver 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 512 may enable the processor 502 to communicate with an Internet or one or more intranets. I/O devices 510 may include a video monitor, liquid crystal display (LCD), touch screen display, or other type of video display for displaying video, and may also include a video recording device for capturing video. I/O devices 510 may also include one or more keyboards, mice, or track balls, or other well-known input devices.

It is understood that by programming and/or loading executable instructions onto the computer system 500, at least one of the processor 502, the RAM 508, and the ROM 506 are changed, transforming the computer system 500 in part into a particular machine or apparatus having the novel functionality taught by the present disclosure. It is fundamental to the electrical engineering and software engineering arts that functionality can be implemented by loading executable software into a computer, which can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An Application Layer Traffic Optimization (ALTO) node, comprising:
  a processor configured to:
    import a first set of network information describing one or more software defined networks (SDNs) from one or more SDN nodes, wherein the first set of network information is filtered to exclude private information associated with each of the SDNs;
    aggregate the first set of network information received from the SDN nodes;
    calculate a plurality of traffic optimization decisions based on the aggregated network information; and
    forward the traffic optimization decisions to the SDN nodes.

2. The ALTO node of claim 1, wherein the processor is further configured to import a second set of network information from a non-SDN compliant node.

3. The ALTO node of claim 2, wherein the processor is further configured to aggregate the first set of network information and the second set of network information, and wherein the traffic optimization decisions are based on the aggregation of the first set of network information and the second set of network information.

4. The ALTO node of claim 2, wherein the non-SDN compliant node is not managed by one of the SDN nodes.

5. The ALTO node of claim 1, wherein the traffic optimization decisions are calculated by selecting a path among a set of paths that span across a plurality of SDN domains.

6. The ALTO node of claim 1, wherein the first set of network information is aggregated to form a complete view of the one or more SDNs.

7. The ALTO node of claim 1, further comprising a transmitter coupled to the processor and configured to query an SDN controller in each of the SDNs for the network information.

8. A method for optimizing traffic using a software defined networking (SDN) node and an Application Layer Traffic Optimization (ALTO) node, wherein the method comprises:
   receiving, by an SDN controller of the SDN, a request for network resources from a node;
   obtaining, by the SDN controller, a plurality of traffic optimization information from the ALTO node after sending networking information that is filtered to exclude private information associated with the SDN to the ALTO node;
   negotiating by the SDN controller, one or more paths with a second SDN node using the traffic optimization information received from the ALTO node;
   constructing, by the SDN controller, the paths; and
   sending, by the SDN controller, a response to the node that indicates the node may forward packets via one of the paths.

9. The method of claim 8, further comprising obtaining a packet from the node and forwarding the packet comprising the network information to the ALTO node after filtering the packet to exclude the private information associated with the SDN.

10. The method of claim 9, wherein the packet is forwarded to the ALTO node after a certain amount of time has elapsed.

11. The method of claim 9, wherein the packet is forwarded after filtering out private information associated with the packet and filtering out the private information associated with the SDN.

12. The method of claim 8, wherein the traffic optimization information are cost maps.

13. The method of claim 8, wherein the private information is filtered according to a domain-specific policy.

14. The method of claim 8, wherein a granularity of the network information sent to the ALTO node is based on a domain-specific policy.

15. A method implemented in an Application Layer Traffic Optimization (ALTO) node, the method comprising:
   importing, via a receiver, a first set of network information describing one or more software defined networks (SDN) from one or more SDN nodes, wherein the first set of network information is filtered to exclude private information associated with each of the SDNs;
   aggregating, via a processor coupled to the receiver, the network information received from the SDN nodes;
   calculating, via the processor, a plurality of traffic optimization decisions based on the aggregated network information; and
   forwarding, via a transceiver coupled to the processor and the receiver, the traffic optimization decisions to the SDN nodes.

16. The method of claim 15, further comprising importing, via the receiver, a second set of network information from a non-SDN compliant node.

17. The method of claim 16, further comprising aggregating the first set of network information and the second set of network information, and wherein the traffic optimization decisions are based on the aggregation of the first set of network information and the second set of network information.

18. The method of claim 16, wherein the non-SDN compliant node is not managed by one of the SDN nodes.

19. The method of claim 15, wherein the traffic optimization decisions are calculated by selecting a path among a set of paths that span across a plurality of SDN domains.

20. The method of claim 15, further comprising querying an SDN controller in each of the SDNs for the network information.

* * * * *